US009280343B2

(12) United States Patent
Zeffer et al.

(10) Patent No.: US 9,280,343 B2
(45) Date of Patent: Mar. 8, 2016

(54) STORE QUEUE WITH TOKEN TO FACILITATE EFFICIENT THREAD SYNCHRONIZATION

(75) Inventors: Haakan E. Zeffer, Enskededalen (SE); Robert E. Cypher, Saratoga, CA (US); Shailender Chaudhry, San Francisco, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1230 days.

(21) Appl. No.: 12/538,717

(22) Filed: Aug. 10, 2009

(65) Prior Publication Data

US 2011/0035561 A1 Feb. 10, 2011

(51) Int. Cl.
*G06F 9/30* (2006.01)
*G06F 9/38* (2006.01)
*G06F 9/52* (2006.01)

(52) U.S. Cl.
CPC .......... *G06F 9/3004* (2013.01); *G06F 9/30087* (2013.01); *G06F 9/3834* (2013.01); *G06F 9/522* (2013.01)

(58) Field of Classification Search
CPC . G06F 9/30043; G06F 9/30087; G06F 9/522; G06F 9/3834

USPC ................................................. 712/218, 225
See application file for complete search history.

(56) References Cited

U.S. PATENT DOCUMENTS

| 6,286,095 | B1 * | 9/2001 | Morris et al. ................. 712/216 |
| 7,089,380 | B1 * | 8/2006 | Schober ........................ 711/156 |
| 7,284,102 | B2 * | 10/2007 | Guthrie et al. ................ 711/158 |
| 7,606,998 | B2 * | 10/2009 | Asher et al. ................... 712/225 |
| 2006/0095741 | A1 * | 5/2006 | Asher et al. ................... 712/225 |

* cited by examiner

*Primary Examiner* — Benjamin Geib
(74) *Attorney, Agent, or Firm* — Park, Vaughan, Fleming & Dowler LLP (57) ABSTRACT

Some embodiments of the present invention provide a system for operating a store queue, wherein the store queue buffers stores that are waiting to be committed to a memory system in a processor. During operation, the system examines an entry at the head of the store queue. If the entry contains a membar token, the system examines an unacknowledged counter that keeps track of the number of store operations that have been sent from the store queue to the memory system but have not been acknowledged as being committed to the memory system. If the unacknowledged counter is non-zero, the system waits until the unacknowledged counter equals zero, and then removes the membar token from the store queue.

20 Claims, 5 Drawing Sheets

STORE QUEUE WITH TOKEN TO FACILITATE EFFICIENT THREAD SYNCHRONIZATION

BACKGROUND

1. Field

The present invention generally relates to the design of processors within computer systems. More specifically, the present invention relates to a store queue that accommodates a membar token to facilitate efficient flag synchronization.

2. Related Art

For performance reasons, modern processors typically place stores, which are to be written to memory, into a store queue. The stores are subsequently drained from the store queue to the memory system after the stores are logically retired by the processor. This improves performance because it enables the processor to perform subsequent loads or stores without having to wait until preceding stores are committed to the memory system.

Under strong memory models, such as sequential consistency or total-store-order (TSO), the system must generally wait for an acknowledgment that a store has been committed to the memory system before a subsequent store can be sent from the store queue to the memory system. This need to wait for acknowledgments can adversely affect system performance. In contrast, weaker memory models, such as partial-store-order (PSO), allow stores to be sent out without receiving such acknowledgments. This allows stores to be pipelined, which can greatly improve system performance.

Systems that use these weaker memory models typically provide instructions, such as a memory-barrier (membar) instruction, that enable the programmer to ensure that preceding stores have committed to the memory system before subsequent stores are sent to the memory system. However, in existing store queue designs, when a membar instruction is encountered, the system typically waits until all preceding stores have been drained from the store queue to memory before a new store can be placed in the store queue. This need to drain the store queue during a membar instruction can adversely affect system performance.

Hence, what is needed is a method and an apparatus that implements such a membar without the above-described performance problems.

SUMMARY

Some embodiments of the present invention provide a system for operating a store queue, wherein the store queue buffers stores that are waiting to be committed to a memory system in a processor. During operation, the system examines an entry at the head of the store queue. If the entry contains a membar token, the system examines an unacknowledged counter that keeps track of the number of store operations that have been sent from the store queue to the memory system but have not been acknowledged as being committed to the memory system. (Note that within this specification the terms "membar token" and "token" are synonymous and are used interchangeably.) If the unacknowledged counter is non-zero, the system waits until the unacknowledged counter equals zero, and then removes the membar token from the store queue.

In some embodiments, if the entry at the head of the store queue is a store, the system waits, if necessary, until the memory system is ready to accept the store, and then sends the store to the memory system so that the memory system can commit the store. Next, the system increments the unacknowledged counter and removes the store from the store queue.

In some embodiments, when removing the store or the membar token from the store queue, the system marks the entry containing the store or membar token as invalid. Next, the system increments a send pointer that points to the head of the store queue, to point to a following entry in the store queue modulo the size of the store queue.

In some embodiments, upon encountering a store or a membar instruction while the processor is executing instructions, if the store queue is full, the system waits until the store queue is not full. Then, the system inserts the store or a membar token into the store queue.

In some embodiments, while inserting the store or the membar token into the store queue, the system marks the entry containing the store or the membar token as valid. Also, if a membar token is being inserted, the system sets a membar flag in the entry. Finally, the system increments a tail pointer that points to the tail of the store queue, to point to a following entry in the store queue modulo the size of the store queue.

In some embodiments, upon receiving an acknowledgment from the memory system at the store queue, wherein the acknowledgment indicates that the memory system has committed a store received from the store queue, the system decrements the unacknowledged counter.

In some embodiments, each entry in the store queue includes: a valid flag indicating whether there exists a valid store or membar token in the entry; a membar flag indicating whether the entry contains a membar token; an address for a store; data for the store; and a byte mask for the store.

In some embodiments, the membar is a store-store membar that ensures that all stores preceding the membar in program order have been committed to the memory system before any stores following the membar in program order are committed to the memory system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system that implements a store-store membar that ensures that all stores preceding the membar in program order have been committed to the memory system before any stores following the membar in program order are committed to the memory system. Upon encountering a store-store membar instruction, the system places a membar token into the store queue. When no such token is present in the store queue, stores can commit to the memory system in any order. However, when such a token is present, stores that are younger than the token cannot commit to the memory system until all stores older than the token have committed. Performance is improved because a thread that executes such a membar does not have to drain its store queue, and can thus continue to execute new code and place new stores in the store queue, even after placing the membar token in the store queue.

In one embodiment of the present invention, the store queue is implemented using a circular first-in-first-out (FIFO) buffer containing entries for stores, along with a head pointer (which is referred to as a "send pointer") and a tail pointer. Whenever a store is added to the store queue, it is added at the tail of the circular FIFO, and the tail pointer is incremented (if space is available). Optionally, a store prefetch can be sent to the memory system. Similarly, when a membar instruction is encountered, a corresponding membar token is placed into an entry in the store queue, wherein the entry is just like an entry for a store.

The store queue also includes an unacknowledged counter that keeps track of the number of stores that have been sent to the memory system but not acknowledged. Whenever a store is sent to the memory system, the acknowledgment counter is incremented, and whenever a store is acknowledged as being completed, the unacknowledged counter is decremented.

As mentioned above, the store queue also includes a send pointer that points to the next store to be sent out (where all earlier stores have been sent to the memory but not necessarily acknowledged). During operation of the store queue, if the send pointer points to a valid store and the memory system is able to accept another store, the store can be sent to the memory system, at which time both the send pointer and the unacknowledged counter are incremented. In contrast, if the send pointer points to a membar token, and the unacknowledged counter is non-zero, the system waits until the unacknowledged counter becomes zero before sending another store to the memory system.

Various implementations of the present invention are described in more detail below.

Multiprocessor System

Figure 1:
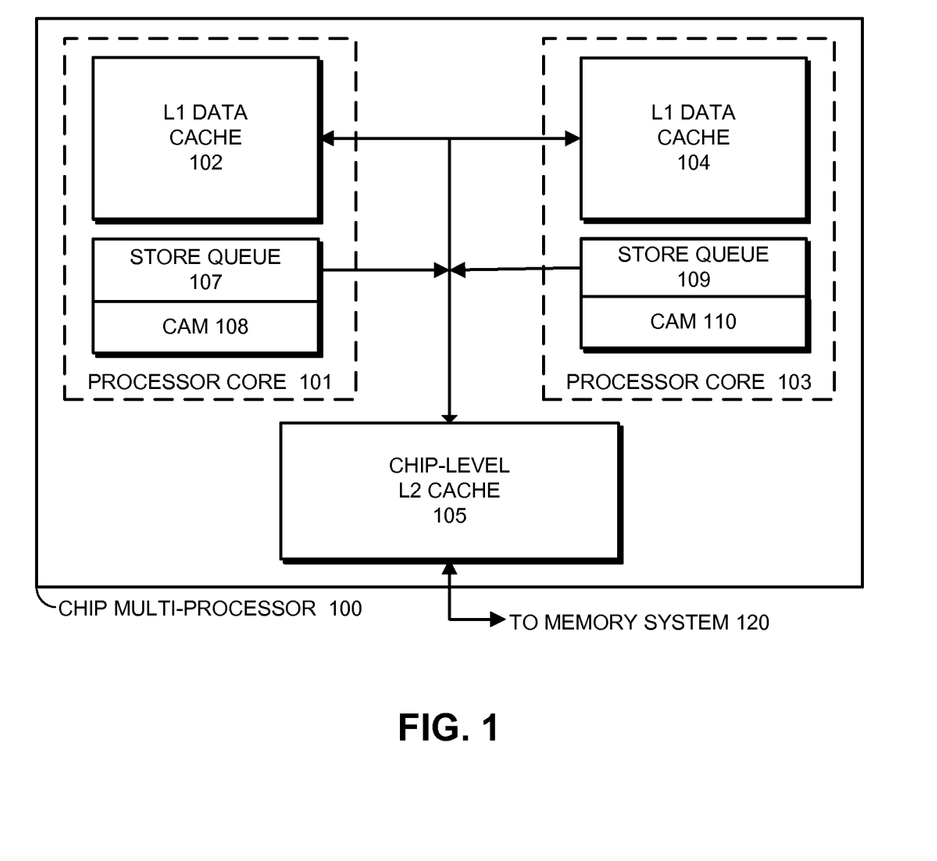
FIG. 1 illustrates a multi-processor system in accordance with an embodiment of the present invention.

FIG. 1 illustrates an exemplary Chip Multi-Processor (CMP) system 100 in accordance with an embodiment of the present invention. CMP system 100 may include, but is not limited to, a multi-processor system which is part of: a server, a laptop computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device.

CMP system 100 is incorporated onto a single semiconductor die, and includes two processor cores, 101 and 103. Processor cores 101 and 103 include L1 data caches 102 and 104, respectively, and they share L2 cache 105. Along with L1 data caches 102 and 104, processor cores 101 and 103 include store queues 107 and 109, which buffer pending stores before the stores are sent to memory system 120. (Note that store queues 107 and 109 include associated content-addressable memory (CAM) circuits 108 and 109, respectively, which can be used to perform content-based lookups in stores queues 107 and 109.) Memory system 120 may include volatile memory and/or non-volatile memory. More specifically, memory system 120 may include: ROM, RAM, EPROM, EEPROM, flash, one or more smart cards, one or more magnetic disc storage devices, and/or one or more optical storage devices.

During a store operation in processor core 101, processor core 101 first performs a lookup for a corresponding cache line in L1 data cache 102. If the lookup generates a miss in L1 data cache 102 (or if store queue 107 is not empty), processor core 101 creates an entry for the store in store queue 107 and sends a corresponding request for the store to L2 cache 105.

During a subsequent load operation, processor core 101 uses a CAM structure 108 to perform a lookup in store queue 107 to locate completed but not-yet-retired stores to the same address that are logically earlier in program order. For each byte being read by the load operation, if such a matching store exists, the load operation obtains its value from store queue 107 rather than from the memory subsystem. (This process is referred to as a "RAW-bypassing operation".)

Although this disclosure illustrates devices and systems as having a number of discrete components, these embodiments are intended to be functional descriptions of the various features that may be present rather than structural schematics of the embodiments described herein. Consequently, in these embodiments, two or more components may be combined into a single component and/or a position of one or more components may be changed. Furthermore, features in two or more of the embodiments may be combined with one another.

Store Queue

Figure 2:
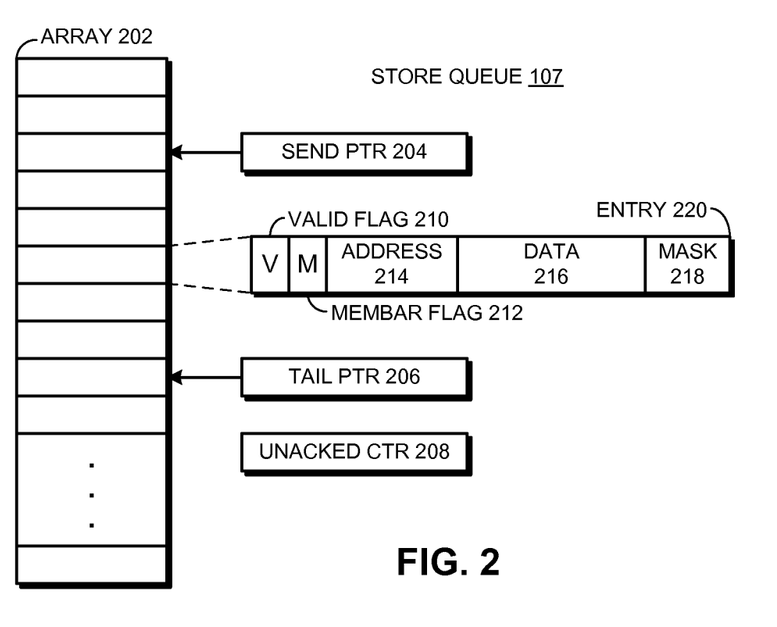
FIG. 2 illustrates a store queue in accordance with an embodiment of the present invention.

FIG. 2 illustrates a store queue 107 in accordance with an embodiment of the present invention. Store queue 200 includes an array of entries for stores 202, as well as a send pointer 204, and a tail pointer 206. In this embodiment, store queue 200 is implemented as a circular first-in-first-out (FIFO) buffer, wherein send pointer 204 points to the head of the FIFO and tail pointer 206 points to the tail of the FIFO. When store queue 200 is empty, send pointer 204 and tail pointer 206 point to the same entry. Similarly, when store queue 200 is full, send pointer 204 and tail pointer 206 also point to the same entry. The system can differentiate between the empty and full conditions by examining a valid bit contained in the entry. If this entry is valid, the FIFO is full. Otherwise, the FIFO is empty.

Store queue 200 also includes an unacknowledged counter 208 that is used to keep track of the number of store operations that have been sent from the store queue to the memory system but have not been acknowledged as being committed to the memory system.

Referring to FIG. 2, a given entry 220 in store queue 200 includes a valid flag 210 that indicates whether the entry contains a valid store or a membar token. It also includes a membar flag 212 that indicates whether the entry contains a membar token. The entry also contains standard components of a store, including a store address 214, store data 216, and a store byte mask 218 indicating which bytes in a word or double-word are to be updated by the store.

Inserting into Store Queue

Figure 3:
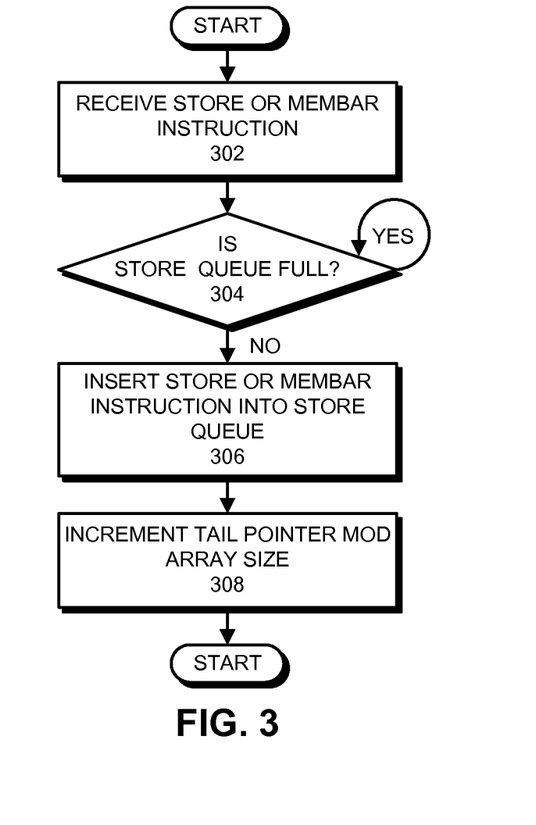
FIG. 3 presents a flow chart illustrating the process of inserting a store or a membar token into the store queue in accordance with an embodiment of the present invention.

FIG. 3 presents a flow chart illustrating the process of inserting a store or a membar token into the store queue 200 in accordance with an embodiment of the present invention. During operation, the processor receives a store or a membar instruction to be executed (step 302). Next, the system determines whether the store queue 200 is full (step 304). (Note that the store queue 200 is full if send pointer 204 overlaps tail pointer 206 and the entry pointed to by send pointer 204 is valid.) If the store queue is full (step 304—yes), the system waits until the store queue is not full. Next, the system inserts the store or the membar token into the store queue (step 306). This involves marking the entry containing the store or the membar token as valid. Also, if a membar token is being inserted, the system sets a membar flag in the entry. Finally, the system increments a tail pointer that points to the tail of the store queue, to point to a following entry in the store queue modulo the size of the store queue (step 308).

Processing Stores and Membar Tokens in Store Queue

Figure 4:
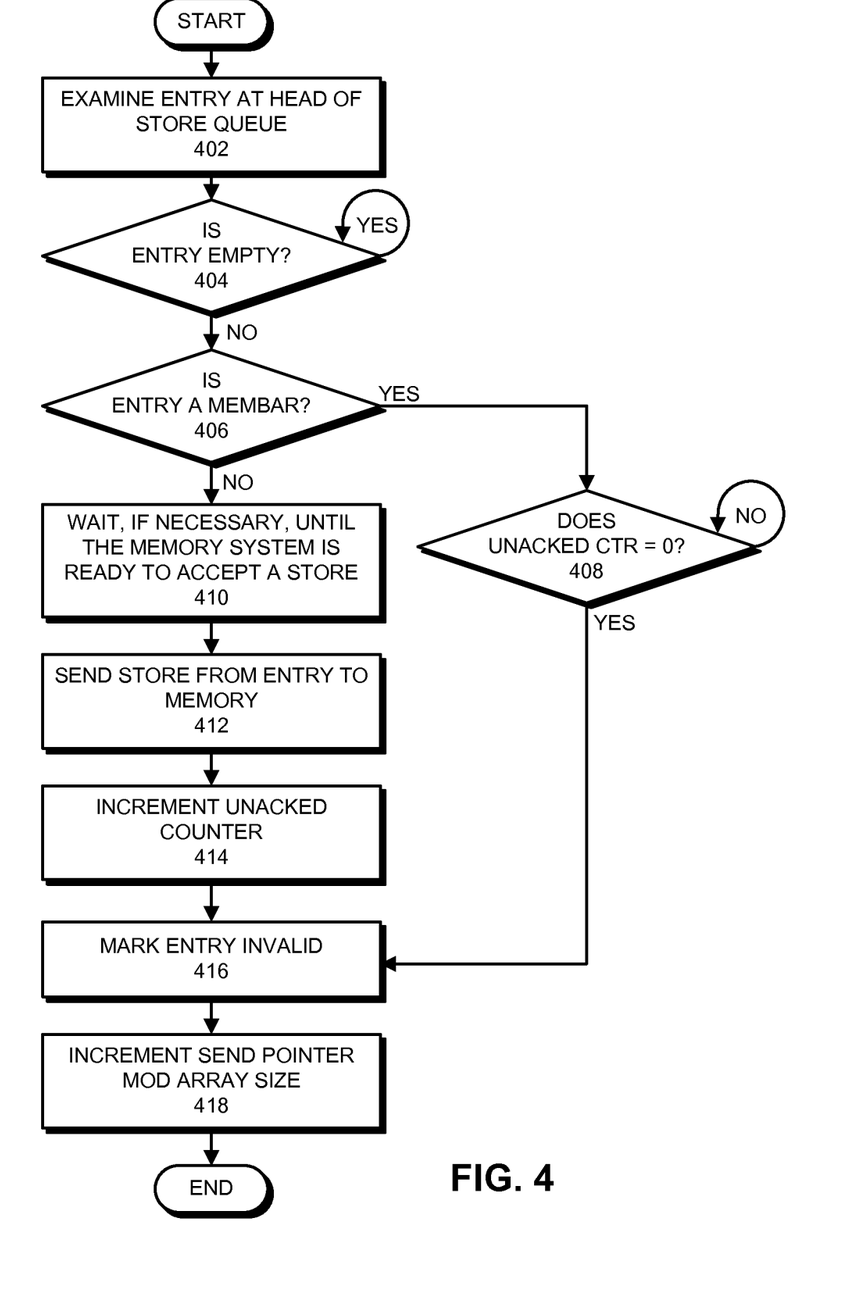
FIG. 4 presents a flow chart illustrating how stores or membar tokens are processed at the head of the store queue in accordance with an embodiment of the present invention.

FIG. 4 presents a flow chart illustrating how stores or membar tokens are processed at the head of the store queue in accordance with an embodiment of the present invention. During operation, the system examines an entry at the head of the store queue (step 402). If the entry is empty, the system waits for the entry to become non-empty (step 404—yes).

Otherwise, if the entry is non-empty (step 404—no), the system determines whether the entry contains a membar token (step 406). If so, the system examines an unacknowledged counter 208 that keeps track of the number of store operations that have been sent from the store queue to the memory system but have not been acknowledged as being committed to the memory system. If unacknowledged counter 208 is non-zero (step 408—no), the system waits until the unacknowledged counter equals zero.

If unacknowledged counter 208 is equal to zero (step 408—yes), the system removes the membar token from the store queue, which involves marking the entry containing the membar token as invalid (step 416) and also unsetting the membar flag, and incrementing the send pointer 204 to point to a following entry in the store queue modulo the size of the store queue (step 418).

On the other hand, if at step 406, the entry is not a membar, but is instead a store, the system waits, if necessary, until the memory system is ready to accept a store (step 410). Then, the system sends the store to the memory system, so that the memory system can commit the store (step 412). Finally, the system increments the unacknowledged counter (step 414), marks the entry containing the store as invalid (step 416), and increments the send pointer 204 to point to a following entry in the store queue modulo the size of the store queue (step 418).

Processing Acknowledgments at the Store Queue

Figure 5:
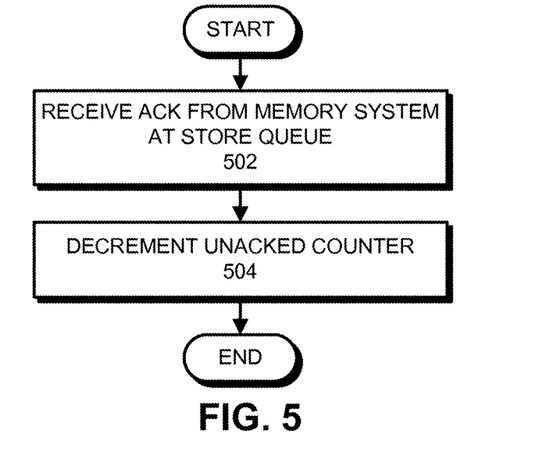
FIG. 5 presents a flow chart illustrating how an acknowledgment is processed by the store queue in accordance with an embodiment of the present invention.

FIG. 5 presents a flow chart illustrating how an acknowledgment is processed by the store queue in accordance with an embodiment of the present invention. First, the system receives an acknowledgment from the memory system at the store queue, wherein the acknowledgment indicates that the memory system has committed a store received from the store queue (step 502). Next, in response to receiving this acknowledgment, the system decrements the unacknowledged counter (step 504).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for processing entries in a store queue, wherein the store queue buffers stores that are waiting to be committed to a memory system in a processor, comprising:
   examining a given entry at the head of the store queue, wherein each entry in the store queue includes a membar flag and a data field, wherein the membar flag indicates whether the entry contains a membar token and wherein, when the entry corresponds to a store, the data field stores data for the store for the entry, and, when the entry corresponds to a membar instruction, the data field stores the membar token, wherein the data is to be committed from the store queue to the memory system; and
   if the membar flag for the given entry indicates that the given entry contains a membar token,
      examining an unacknowledged counter that keeps track of the number of store operations that have been sent from the store queue to the memory system but have not been acknowledged as being committed to the memory system,
      if the unacknowledged counter is non-zero, waiting until the unacknowledged counter equals zero, and
      removing the membar token from the store queue by marking the given entry as invalid and unsetting the membar flag for the given entry.

2. The method of claim 1, wherein if the given entry is a store, the method further comprises:
   waiting, if necessary, until the memory system is ready to accept the store;
   sending the store to the memory system so that the memory system can commit the store;
   incrementing the unacknowledged counter; and
   removing the store from the store queue.

3. The method of claim 2, wherein removing the store from the store queue involves:
   marking the given entry as invalid; and
   incrementing a send pointer that points to the head of the store queue, to point to a following entry in the store queue modulo the size of the store queue.

4. The method of claim 1, wherein upon encountering a store or a membar instruction while the processor is executing instructions, the method further comprises:
   if the store queue is full, waiting until the store queue is not full; and
   inserting the store or a membar token into the store queue.

5. The method of claim 4, wherein inserting the store or the membar token into the store queue involves:
- marking the entry containing the store or the membar token as valid;
- if a membar token is being inserted, setting a membar flag in the entry; and
- incrementing a tail pointer that points to the tail of the store queue, to point to a following entry in the store queue modulo the size of the store queue.

6. The method of claim 1, further comprising decrementing the unacknowledged counter upon receiving an acknowledgment from the memory system at the store queue, the acknowledgment indicating that the memory system has committed a store received from the store queue.

7. The method of claim 1, wherein each entry in the store queue includes:
- a valid flag indicating whether there exists a valid store or membar token in the entry;
- an address for a store; and
- a byte mask for the store.

8. The method of claim 7, wherein removing the membar token from the store queue involves incrementing a send pointer that points to the head of the store queue to point to a following entry in the store queue modulo the size of the store queue,
  wherein marking the given entry as invalid comprises changing the valid flag and the membar flag for the given entry.

9. The method of claim 1, wherein the membar instruction is a store-store membar that ensures that all stores preceding the membar instruction in program order have been committed to the memory system before any stores following the membar instruction in program order are committed to the memory system.

10. The method of claim 1, further comprising:
- in response to receiving the membar instruction, placing the membar token in a first entry of the store queue and setting a membar flag for the first entry, wherein the first entry is at the head of the store queue.

11. A processor with a store queue, comprising:
- the processor;
- the store queue within the processor, wherein each entry in the store queue includes a membar flag and a data field, wherein the membar flag indicates whether the entry contains a membar token and wherein, when the entry corresponds to a store, the data field stores data for the store for the entry, and when the entry corresponds to a membar instruction, the data field stores the membar token, wherein the data is to be committed from the store queue to the memory system; and
- an unacknowledged counter within the store queue that keeps track of the number of store operations that have been sent from the store queue to a memory system but have not been acknowledged as being committed to the memory system;
- wherein when the membar token is at the head of the store queue, the store queue is configured to,
  - examine the unacknowledged counter,
  - if the unacknowledged counter is non-zero, wait until the unacknowledged counter equals zero, and
  - remove the membar token from the store queue by marking the entry containing the membar token as invalid and unsetting the membar flag for the entry.

12. The processor of claim 11, wherein if the entry at the head of the store queue is a store, the store queue is configured to:
- wait, if necessary, until the memory system is ready to accept the store;
- send the store to the memory system so that the memory system can commit the store;
- increment the unacknowledged counter; and
- remove the store from the store queue.

13. The processor of claim 12, wherein while removing the store from the store queue, the store queue is configured to:
- mark the entry containing the store as invalid; and
- increment a send pointer that points to the head of the store queue, to point to a following entry in the store queue modulo the size of the store queue.

14. The processor of claim 12, wherein upon encountering a store or a membar instruction while the processor is executing instructions, the store queue is configured to:
- wait, if the store queue is full, until the store queue is not full; and
- insert the store or a membar token into the store queue.

15. The processor of claim 14, wherein while inserting the store or the membar token into the store queue, the store queue is configured to:
- mark the entry containing the store or the membar token as valid;
- if a membar token is being inserted, set a membar flag in the entry; and
- increment a tail pointer that points to the tail of the store queue, to point to a following entry in the store queue modulo the size of the store queue.

16. The processor of claim 11, wherein upon receiving an acknowledgment from the memory system at the store queue, wherein the acknowledgment indicates that the memory system has committed a store received from the store queue, the store queue is configured to decrement the unacknowledged counter.

17. The processor of claim 11, wherein the membar is a store-store membar that ensures that all stores preceding the membar in program order have been committed to the memory system before any stores following the membar in program order are committed to the memory system.

18. A computer system containing a processor with a store queue, comprising:
- the processor;
- the store queue within the processor, wherein each entry in the store queue includes a membar flag and a data field, wherein the membar flag indicates whether the entry contains a membar token and wherein, when the entry corresponds to a store, the data field stores data for the store for the entry, and when the entry corresponds to a membar instruction, the data field stores the membar token, wherein the data is to be committed from the store queue to the memory system;
- a memory system coupled to the store queue; and
- an unacknowledged counter within the store queue that keeps track of the number of store operations that have been sent from the store queue to a memory system but have not been acknowledged as being committed to the memory system;
- wherein when a membar token is at the head of the store queue, the store queue is configured to,
  - examine the unacknowledged counter,
  - if the unacknowledged counter is non-zero, wait until the unacknowledged counter equals zero, and
  - remove the membar token from the store queue by marking the entry containing the membar token as invalid and unsetting the membar flag for the entry.

19. The computer system of claim 18, wherein if the entry at the head of the store queue is a store, the store queue is configured to:
- wait, if necessary, until the memory system is ready to accept the store;
- send the store to the memory system so that the memory system can commit the store;
- increment the unacknowledged counter; and
- remove the store from the store queue, wherein removing the store from the store queue involves:
  - marking the entry containing the store as invalid; and
  - incrementing a send pointer that points to the head of the store queue, to point to a following entry in the store queue modulo the size of the store queue.

20. The computer system of claim 18, wherein upon encountering a store or a membar instruction while the processor is executing instructions, the store queue is configured to:
- wait, if the store queue is full, until the store queue is not full; and
- insert the store or a membar token into the store queue.

\* \* \* \* \*